US006663911B2

(12) United States Patent
Valli et al.

(10) Patent No.: US 6,663,911 B2
(45) Date of Patent: Dec. 16, 2003

(54) METHODS OF MAKING STERILIZED MILK COMPOSITIONS COMPRISING NATIVE GELLAN GUM

(75) Inventors: Raymond C. Valli, San Diego, CA (US); Neil A. Morrison, San Diego, CA (US)

(73) Assignee: C. P. Kelco U.S., Inc., Wilmington, DE (US)

( * ) Notice: Subject to any disclaimer, the term of this patent is extended or adjusted under 35 U.S.C. 154(b) by 141 days.

(21) Appl. No.: 09/774,693

(22) Filed: Feb. 1, 2001

(65) Prior Publication Data

US 2002/0146499 A1 Oct. 10, 2002

(51) Int. Cl.[7] .................................................. A23C 9/00
(52) U.S. Cl. ...................... 426/580; 426/522; 426/573
(58) Field of Search ................................. 426/580, 583, 426/586, 522, 573, 34, 42

(56) References Cited

U.S. PATENT DOCUMENTS 5,597,604 A   1/1997  Chalupa et al. ............. 426/590
6,242,035 B1  6/2001  Clark et al. ................. 426/573

FOREIGN PATENT DOCUMENTS

DE   198 32 737    2/1999
WO   00/31146      6/2000

*Primary Examiner*—Leslie Wong
(74) *Attorney, Agent, or Firm*—Banner & Witcoff Ltd.

(57) ABSTRACT

The present invention relates to a method of making a sterilized milk composition containing native gellan gum, wherein the native gellan gum has been pre-treated with a denaturing agent. The method comprises the step of pre-treating the native gellan gum with a denaturing agent such as a common oxidative agent or an alkaline caustic agent prior to mixing and sterilizing the native gellan in milk. Preferably, treatment with the denaturing agent results in reduction of para-cresol levels in the sterilized native gellan/milk composition to below 25 ppb after 12 months of storage, and most preferably, to levels where para-cresol is undetectable by taste. The present invention further relates to sterilized milk compositions and milk-based gellan food products.

25 Claims, No Drawings

METHODS OF MAKING STERILIZED MILK COMPOSITIONS COMPRISING NATIVE GELLAN GUM

BACKGROUND OF THE INVENTION

1. Field of the Invention

The present invention relates to a method of making sterilized milk compositions comprising native gellan gum, wherein the native gellan gum has been pre-treated with a denaturing agent. The present invention further relates to the resulting sterilized milk compositions and to the milk-based gellan food products.

2. Related Background Art

Gellan gum is an extracellular polysaccharide produced by the bacteria *Sphingomonas elodea*. A number of *S. elodea* strains produce gellan gum with differing characteristics, including S-60, LPG-2, PDG-1 and PDG-4. Gellan gum produced by *S. elodea* is commercially available as Kelcogel LT100® from CP Kelco in San Diego, Calif.

Commercially, gellan gum is formed by inoculating a fermentation medium under aerobic conditions with *S. elodea* bacteria. The fermentation medium contains a carbon source, phosphate, organic and inorganic nitrogen sources and appropriate trace elements. The fermentation is conducted under sterile conditions with strict control of aeration, agitation, temperature and pH. Upon completion of the fermentation, the viscous broth is pasteurized to kill viable cells prior to recovery of the gum.

The primary structure of gellan gum comprises the sugars glucose, glucuronic acid and rhamnose in a 2:1:1 molar ratio, which are linked together, as depicted below, to form a tetrasaccharide repeat unit. In the native form, gellan gum is modified by acetyl and glyceryl substituents on the same glucose residue. On average, there is one glycerate substituent per tetrasaccharide repeat unit and one acetate substituent per every two tetrasaccharide repeat units. The chemical structure of native gellan gum may be depicted as follows:

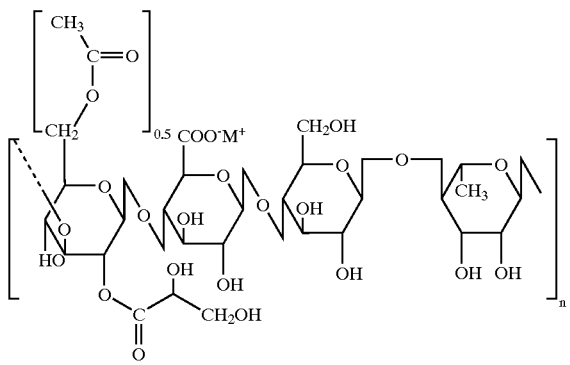

wherein n is between about 500 and about 2500. Gellan gum displays different characteristics depending upon the method of recovery from the fermentation broth. Direct recovery from the fermentation broth yields gellan gum in its native, high acyl form, which is modified by *S. elodea* with acetyl and glyceryl substituents on one glucose residue. Isolation of gellan gum in this native, high acyl form yields a soft, flexible gel. At low dosage levels, gellan gum is characterized by very high low-shear viscosity and true yield stress.

The texture of native gellan gum is ideal for a number of commercial food applications, including milk-based products such as puddings, coffee creamers, drinks and desserts. The rheology of gellan gum at low dosage enables it to suspend fine particles such as cocoa in milk systems. As a result of these textural characteristics, gellan gum has long been sought for use in cultured dairy products, retorted dairy products and frozen dairy products.

Unfortunately, however, an off-flavor and odor develop in the shelf-stable, milk-based gellan products after a short time that renders the food product unpalatable. The off-flavor and odor have been described as reminiscent of a cleaning chemical or of fecal matter. Analysis of the food product has linked the off-flavor and odor to the development of a chemical called para-cresol, which is detectable in milk-based gellan products that have been treated at ultra high temperatures and further stored at room temperature. The development of para-cresol in sterilized milk compositions comprising native gellan gum limits their potential commercial applications for products that require long-term storage, including many beverages and puddings.

Several attempts have been made to modify gellan gum to render it usable in dairy products sterilized by ultra-high temperature treatment. Deacylation of the glucose moiety, while effective at eliminating para-cresol, nonetheless changes the texture of the gellan gum, making it more brittle and less conducive for use in food applications.

It would be advantageous to provide a method of making a sterilized milk composition comprising native gellan gum that eliminates or reduces para-cresol development without undue change to the composition's taste, odor or textural characteristics.

SUMMARY OF INVENTION

The present invention provides a method of making sterilized milk compositions comprising native gellan gum, wherein the native gellan gum has been pre-treated with a denaturing agent. The method comprises the step of pre-treating native gellan gum with a denaturing agent such as a common oxidative agent or an alkaline caustic agent prior to mixing and sterilizing the native gellan/milk composition. Preferably, treatment of the native gellan gum with the denaturing agent results in reduction of para-cresol levels in the sterilized native gellan/milk composition to below 25 parts per billion (ppb) after 12 months of storage, and most preferably, to levels where para-cresol is undetectable by taste.

In one preferred embodiment of the present invention, the denaturing agent of the present invention is a common oxidative agent such as sodium hypochlorite. In an alternative embodiment, the denaturing agent is a caustic agent such as potassium hydroxide. In a preferred embodiment of the invention, the native gellan gum is further pre-treated by enzymes such as lysozyme and/or protease.

The present invention is further directed to the food products comprising the treated gellan gum and the sterilized milk.

DETAILED DESCRIPTION OF THE INVENTION

As defined herein, sterilization refers to treatment at ultra-high temperatures of over 138° C. for over 2 seconds. Most preferably, sterilization is performed at about 140–150° C. for approximately 4–6 seconds. After sterilization and packaging in air-tight containers, sterilized milk may be stored at room temperature for up to 12 months without degradation.

It is known that para-cresol develops in sterilized milk when the enzymes glucuronidase and aryl sulfatase have been added (J. Agr. Food Chem. Vol. 1, 1973). It is believed that when native gellan gum is combined with milk and sterilized, small amounts of the residual enzymes found in native gellan gum(presumably glucuronidase and aryl sulfatase) survive the ultra-high temperature heat processing. Over time, these residual enzymes in the native gellan gum cleave the naturally occurring para-cresol conjugates in the sterilized native gellan/milk composition to generate free para-cresol.

Without being bound by theory, it is furthermore believed that para-cresol production can be disrupted by denaturing the residual enzymes that reside in the native gellan gum. In particular, para-cresol production can be interrupted by addition of a denaturing agent.

The denaturing agent of this invention is any agent capable of disrupting the enzymatic pathway by which para-cresol is produced. In one preferred embodiment, the denaturing agent is an oxidative agent, such as hydrogen peroxide, ozone or any of the hypochlorite salts. Most preferably, the oxidative agent is sodium hypochlorite.

In another preferred embodiment, the denaturing agent is an alkaline caustic agent selected from the group consisting of hydroxide salts, carbonate salts, alkaline phosphate salts or other alkaline caustic agents well-known in the art. Preferred alkaline caustic agents include potassium hydroxide (KOH), sodium hydroxide (NaOH), trisodium- or tetrasodium-polyphosphate.

Additional steps may be performed to optimize para-cresol reduction. A further optional step of adding a chelating agent may be performed during treatment with the denaturing agent. In addition, after treatment with the denaturing agent and the optional chelating agent, the native gellan gum may be subjected to treatment with lysozyme or protease to break up residual cellular debris. Alternatively, if a caustic agent such as KOH is used, then lysozyme may be added prior to addition of KOH, so that the lysozyme may function at its optimal pH, which is acidic to neutral. In this alternative method, the gellan gum is treated first with lysozyme, followed by treatment with the alkaline caustic agent and optional neutralization, then treatment with a protease. The protease is capable of reacting at a pH of about 8 or higher. This latter alternative method optimizes pH conditions in order to provide optimal reactive conditions.

In each of the above embodiments, para-cresol production in the sterilized native gellan/milk composition is reduced to preferably less than about 25 ppb after 12 months storage, or most preferably, to an undetectable level. Testing for para-cresol may be performed by odor or taste, i.e., a rudimentary mouth swirl test. Typically, para-cresol can be detected by taste in concentrations as low as 2 ppb in water. In addition, precise quantification of para-cresol content may be performed by extracting milk continuously in a liquid-liquid extractor with equal parts dichloromethane. The organic phase of the solution can then be dried over anyhydrous sodium sulfate, then concentrated in a Danish-Kuderna apparatus. The concentrated extract can then be analyzed by gas chromatographic-mass spectroscopy, with quantification being achieved by using known solutions of para-cresol. The above quantification method detects para-cresol levels to a minimum of 0.5 ppb.

Addition of Denaturing Agent

The method for reducing para-cresol production is performed directly on the native gellan gum. Preferably, the method is performed in a fluid sample such as in a native gellan fermentation broth prior to precipitation, or if already precipitated, in a reconstituted broth. After fermentation or reconstitution, the gellan broth is heated to a temperature ranging from about 25° C. to about 100° C. by techniques well-known in the art, for example, by temperature control in a jacketed tank or by direct steam injection or the like. Preferably, steam injection is used to reduce heating time. The desired temperature range of the broth varies depending upon which denaturing agent is used. Where the denaturing agent is an oxidative agent such as sodium hypochlorite, the temperature ranges from about 5° C. to about 100° C., and is preferably about 20° C. to about 50° C. Where the denaturing agent is an alkaline caustic agent, the temperature ranges from about 25° C. to about 70° C., and is preferably about 40° C. to about 60° C.

In addition, where the denaturing agent is an alkaline caustic agent, the pH of the gellan gum broth should preferably be neutralized to a range of about 5 to 9 pH, and most preferably below 7 pH. Raising the pH to above 9 risks deacylation of native gellan's glucose moieties, producing a hard, brittle gel unsuitable for most food applications.

The denaturing agents, chelating agents and enzymes are added sequentially to the broth by mixing as per one of the following two protocols, as indicated below.

In the first protocol, the denaturing agent is added directly to the gellan broth. The mixing time for the denaturing agent in the gellan broth is typically 0.5 to about 2 hrs, and is preferably 0.5 to about 1.0 hour, followed by up to 24 hours of storage. Mixing is conducted by techniques well-known in the art, such as by scrape surface propeller mixing or other well-known mixing techniques. Furthermore, if the denaturing agent is an oxidative agent, then mixing of the broth and denaturing agent for as little as 1 minute may be sufficient. The preferred concentration range of the denaturing agent varies depending on the type used. For oxidative agents, the preferred range is between about 250 ppm to about 1500 ppm, and is most preferably between about 500 ppm to about 1000 ppm. For alkaline caustic agents, the preferred range is between about 500 ppm to about 2000 ppm, and is most preferably between about 500 ppm to about 1500 ppm.

Addition of Chelating Agents

An optional chelating agent, such as citrate, EDTA, or any of a number of polyphosphates or the like, may be added with the denaturing agent in the gellan broth. The preferred range of chelating agent ranges from 0 to 3000 ppm, and is most preferably about 1000 to 2000 ppm. Treatment with the chelating agent is conducted for preferably about 1 hour, followed by enzymatic treatment as described below.

Enzymatic Treatment

In a most preferred embodiment of the invention, an optional step of enzyme treatment is performed on the gellan broth to break up residual cellular debris. After treatment with the denaturing agent (and chelating agent, if elected) the gellan broth is treated with enzyme. One or more enzymes can be added, either in sequence or together, with treatment typically lasting from 1 to 3 hours for each. Most preferably, enzyme treatment includes both a lysozyme and protease for about 2 hours each. The lysozyme concentration varies between 1 to 100 activity units, and is preferably about 22 activity units. The protease concentration ranges from 220 to 440 activity units, and is preferably about 220 activity units. Treatment with lysozyme and/or protease may occur contemporaneously or sequentially, in any order.

Variations with Alkaline Caustic Agents

As mentioned above, the denaturing agent may be a common oxidative agent such as hydrogen peroxide, ozone or a hypochlorite salt, or the denaturing agent may be an alkaline caustic agent, such as the hydroxide salts, carbonate salts and alkaline phosphate salts. If the denaturing agent is an alkaline caustic agent, then a second protocol may be preferred. In the second protocol, lysozyme treatment precedes treatment with the alkaline caustic agent, with protease treatment being performed last. This second protocol permits lysozyme to react in the gellan broth under its optimal pH conditions, which is acidic to neutral. After addition of the alkaline caustic agent and any subsequent neutralization, the pH thereby rises, allowing the protease to be added for reaction at its preferred pH of about 8 or higher. As in the first protocol, the mixing time for the caustic agent is typically 0.5–2 hours each, and is most preferably 0.5 to about 1.0 hours. Typical levels for the alkaline caustic are the same as above, at between about 500 ppm to about 2000 ppm and most preferably between about 500 ppm to about 1500 ppm. The range of chelating agent concentrations are the same as described above, as are the lysozyme and protease concentrations.

Precipitation of Native Gellan

After treatment with the denaturing agent, and any optional chelating agent and enzymes, the sample is then pasteurized by heating to 80° C. or above and adjusted to a slightly acidic pH in the range of about 5 to 7 pH prior to combining with milk in the desired amount. Once combined with milk, the native gellan/milk composition is subjected to sterilization at ultra high temperatures.

Preferably, the native gellan is precipitated, or re-precipitated as the case may be, in alcohol prior to mixing with milk and sterilization. Most preferably, the gellan is precipitated by treatment with isopropanol and water (90% IPA). After mixing till sufficiently blended, the precipitated fiber may then be dried in an oven at a temperature of 40–50° C. overnight. The resulting dried fiber can be hydrated in milk solutions and then sterilized to provide desirable suspension or Theological properties.

In addition to the above sequence steps, surfactants such as SDS and Tween 80® can be used in the process using caustic and sequestrants to further improve the purity of the final native gellan gum.

The above sequence of steps permits for a significant reduction of para-cresol when combined and stored with milk without noticeable effect on gel texture. Moreover, the above method maintains the taste and odor of the original dairy formulation.

The above method provides a sterilized native gellan/milk composition that may then be used in a myriad of dairy food formulations. Such dairy food formulations include, but are not limited to, frozen, refrigerated or stored foods such as milk, ice creams, frozen yogurts, puddings, whips, creamers, creme brulee and beverages.

EXAMPLE 1

Para-cresol Reduction by Treatment with Oxidizing Agents as Denaturing Agent 5 gal of warm Kelcogel LT100® (gellan broth) was heated to 40° C. An oxidizing agent as provided in Table A below was then introduced to the gellan broth, and agitated for about 5 minutes by a high speed mixer. The broth was then stored at 24° C. for various times.

To precipitate the gellan, the hot gellan broth was heated to 90° C. with a steam-jacketed scraped surface cooker in a 50 L kettle. The melted broth was then treated with 2300 ppm of $H_3PO_4$ for about 5 minutes, and then treated with 2 volumes of 86% isopropanol using propeller mixing at about 2000 rpm. After mixing, the precipitated gellan fiber was removed and dried overnight (approximately 12 hours) in an oven at 24° C. and then milled to about 0.5 mm.

The milled gellan gum was then suspended in milk at 0.12%, sterilized at ultra-high temperatures, and stored at room temperature. After one month of storage, para-cresol development in the native gellan/milk samples was tested by taste (mouth swirl test) and odor, followed by quantification of para-cresol concentration. Quantification of para-cresol was performed by extracting approximately 700 ml of the native gellan/milk continuously over 4 hours in a liquid-liquid extractor with about 700 ml dichloromethane. The organic phase was dried over anyhydrous sodium sulfate, concentrated to 1 ml in a Danish-Kuderna apparatus and analyzed by gas chromatographic-mass spectroscopy. The results of para-cresol testing are indicated in Table A below.

Gel samples were made by mixing 295 ml of deionized water, 2 ml of 0.3 M Ca stock solution, and 3.0 g of gellan product in a tared 600 ml beaker. After mixing for 1 to 2 minutes in the solution, the beaker was placed into a pre-heated water bath maintained at approximately 100° C. and covered with aluminum foil while the internal temperature was brought to 95° C. A propeller mixer was used to stir the sample for 3 minutes at a speed slow enough to avoid trapping air by vortex. The beaker was then removed from the hot water bath and brought to 300 g with pre-heated deionized water, and stirred manually for 30 seconds. The aluminum foil was then replaced and the beaker was put back into the water bath for an additional 4 minutes, after which the beaker was again removed and the samples were transferred into ring molds for the texture analyzer. After 20–24 hours at room temperature, the gels were equilibrated to 20–21° C. for at least 2 hours and tested with a TA-TX2 Texture Analyzer®, using a TA-19 Plunger® (Texture Technologies Corp., Scarsdale, N.Y.). The TA-TX2 Texture Analyzer measures gel texture as a product of two indicators, the amount of puncture force and distance required to fracture a prepared gel surface with a pressure-sensing plunger. Gel texture data, i.e. puncture force and puncture distance, for each sample is also provided in Table A below.

TABLE A

Reduction of Para-cresol by Application of Oxidizing Agent as Denaturing Agent

| Denaturing Treatment | Para-cresol (ppb) | Taste & Odor | Puncture Force (g) | Puncture Distance (%) |
|---|---|---|---|---|
| Control (none) | 48 | Para-cresol | 1007.73 | 94.34 |
| 1000 ppm NaHClO | 0 | None | 833.41 | 92.12 |
| 1000 ppm $H_2O_2$ | 36 | Diesel, chemical | 785.86 | 92.10 |
| 500 ppm NaHClO | 3 | Diesel, chemical | 964.88 | 93.35 |

As indicated in Table A above, 1000 ppm of NaHClO was sufficient to eliminate para-cresol development completely after one month.

As shown in Table A, gel strength with respect to puncture force decreased about 174.32 g for the 1000 ppm sodium hypochlorite sample, as compared to the control of 1007.73 g. Therefore, puncture force decreased approximately 17%, with a less pronounced decrease in the lower concentrate 500 ppm treatment with sodium hypochlorite. Puncture distance was not significantly affected in any of the samples treated with an oxidative agent, indicating that gel texture overall remained relatively unchanged.

EXAMPLE 2

Para-cresol Reduction by Treatment with Alkaline Caustic Agent as Denaturing Agent 5 gal of Kelcogel LT100® (gellan broth) was transferred into an agitated steam cooker in a 50 L kettle and heated to 40° C. At this point, a portion of the gellan broth was poured out as a control sample, and precipitated as described in Example 1. After precipitation, the control sample of native gellan was combined with milk at 0.12%, sterilized and stored for one month, after which it was tested for para-cresol by taste and odor.

The remainder of the gellan broth was subjected to treatment with 1.5 g of KOH, the alkaline caustic agent, and agitated for approximately 6 hours at 40° C., at a pH of about 6.0. At this point, a portion of the broth was poured out as a second sample, and precipitated as described in Example 1. After precipitation, the second sample of native gellan was combined with milk at 0.12%, sterilized and stored for one month, after which the composition was tested for para-cresol by taste and odor.

The remainder of the KOH-treated gellan broth was adjusted to a pH of about 7.0 for additional treatment with about 50 activity units of MULTIFECT® lysozyme (Genencor, Rochester, N.Y.) at 40° C. for about 2 hours. At this point, a portion of the gellan broth was poured out as a third sample and precipitated as described in Example 1. After precipitation, the third sample of native gellan was combined with milk at 0.12%, sterilized and stored for one month, after which it was tested for para-cresol by a taste and odor test.

The remaining portion of KOH-treated and lyosozyme-treated gellan broth was further treated with approximately 22000 activity units of HT PROLYTIC® protease (Enmex, S. A., of Mexico) for 2 hours at 40° C. The remaining protease-treated gellan broth was poured out as a fourth sample and precipitated as described in Example 1. After precipitation, the fourth sample of gellan was combined with milk at 0.12%, sterilized and stored for one month, after which it was tested for para-cresol by mouth swirl test.

For each of the above samples, the gellan fiber was recovered at a pH of about 6.0.

The results of the taste and odor test are described in Table B below. Quantification of para-cresol levels was performed according to the technique described in Example 1 above.

Gel samples were prepared and measured for texture as described in Example 1 above. Gel texture data, i.e. puncture force and puncture distance, for each sample is also provided in Table B below.

TABLE B

Reduction of Para-cresol by Application of Caustic Agent as Denaturing Agent

| Denaturing Treatment | Para-cresol (ppb) | Taste & Odor | Puncture Force (g) | Puncture Distance (%) |
|---|---|---|---|---|
| Control | 157 | very strong para-cresol | 429.532 | 91.417 |
| 1.5 g KOH only | 4 | None | 526.637 | 88.967 |
| 1.5 g KOH + Lysozyme | 12 | None | 467.821 | 89.697 |
| 1.5 g KOH + Lysozyme + Protease | 10 | None | 600.862 | 88.494 |

As indicated in Table B above, 1.5 g KOH was sufficient to eliminate para-cresol taste after one month. Treatment with KOH and both lysozyme and protease enzymes also were able to reduce para-cresol to 25 ppb or below, with each of the above 1.5 g KOH samples producing no discernable para-cresol odor or taste.

Table B further indicates that gel strength with respect to puncture force increased about 97.105 g for the 1.5 g KOH only sample, as compared to the control of 429.532 g. Therefore, puncture force increased approximately 22%, with a greater increase evident in the KOH samples further treated with both lysozyme and protease. As with treatment by oxidative agents, puncture distance was not significantly affected in any of the samples treated with an alkaline caustic agent, indicating that gel texture remained relatively unchanged.

Other variations and modifications of this invention will be obvious to those skilled in the art. This invention is not limited except as set forth in the claims.

What is claimed is:

1. A method of making sterilized milk composition comprising native gellan gum, said method comprising the step of pre-treating the native gum with a denaturing agent prior to combining the gellan gum with milk, and the step of sterilizing the milk composition after combining the gellan gum with milk, wherein treatment with the denaturing agent is effective to reduce para-cresol in the sterilized milk composition to below 25 ppb after 12 months of storage.

2. The method according to claim 1, wherein para-cresol is undetectable by taste.

3. The method according to claim 1, wherein the denaturing agent is an oxidative agent.

4. The method according to claim 3, wherein the oxidative agent is added in an amount between about 250 ppm to about 1500 ppm.

5. The method according to claim 3, wherein the oxidative agent is selected from the group consisting of hydrogen peroxide, ozone and hypochlorite salts.

6. The method according to claim 1, wherein the denaturing agent is an alkaline caustic agent.

7. The method according to claim 6, wherein the alkaline caustic agent is added in an amount between about 500 ppm to about 2000 ppm.

8. The method according to claim 6, wherein the alkaline caustic agent is selected from the group consisting of hydroxide salts, carbonate salts and alkaline phosphate salts.

9. The method according to claim 1, further comprising the step of adding a chelating agent during treatment with the denaturing agent; wherein the chelating agent is selected from the group consisting of citrate, EDTA, or a polyphosphate.

10. The method according to claim 1, further comprising the step of adding a lysozyme after treatment with the denaturing agent.

11. The method according to claim 1 or 10, further comprising the step of adding a protease after treatment with the denaturing agent.

12. The method according to claim 6, further comprising the step of adding a lysozyme prior to treatment with the alkaline caustic agent.

13. The method according to claim 12, further comprising the step of adding a protease after treatment with the alkaline caustic agent.

14. A sterilized milk composition prepared by the method of claims 3 or 6.

15. A sterilized composition comprising milk and native gellan gum, wherein the native gellan gum, prior to combination with the milk, is treated with a denaturing agent in an amount effective to reduce para-cresol in the composition to below 25 ppb after 12 months of storage.

16. The composition according to claim 15, wherein the denaturing agent is an oxidative agent.

17. The composition according to claim 16, wherein the gellan gum has been treated with about 250 ppm to about 1500 ppm of the oxidative agent.

18. The composition according to claim 16, wherein the oxidative agent is selected from the group consisting of hydrogen peroxide, ozone and hypochlorite salts.

19. The composition according to claim 15, wherein the denaturing agent is an alkaline caustic agent.

20. The composition according to claim 19, wherein the gellan gum has been treated with about 500 ppm to about 2000 ppm of the alkaline caustic agent.

21. The composition according to claim 19, wherein the alkaline caustic agent is selected from the group consisting of hydroxide salts, carbonate salts and alkaline phosphate salts.

22. The composition according to claim 15, wherein the native gellan gum, prior to combination with the milk, is further treated with a chelating agent selected from the group consisting of citrate, EDTA, or a polyphosphate.

23. The composition according to claim 15, wherein the native gellan gum, prior to combination with the milk, is further treated with a lysozyme.

24. The composition according to claim 15 or 23, wherein the native gellan gum, prior to combination with the milk, is further treated with a protease.

25. A dairy food product comprising the composition of claim 15, wherein the dairy food product is selected from the group consisting of milk, ice creams, frozen yogurts, puddings, whips, creamers, creme brulee and beverages.

* * * * *